(12) United States Patent
Waeller et al.

(10) Patent No.: US 9,487,138 B2
(45) Date of Patent: Nov. 8, 2016

(54) METHOD FOR OUTPUTTING ALERT MESSAGES OF A DRIVER ASSISTANCE SYSTEM AND ASSOCIATED DRIVER ASSISTANCE SYSTEM

(71) Applicant: Volkswagen Aktiengesellschaft, Wolfsburg (DE)

(72) Inventors: Christoph Waeller, Braunschweig (DE); Johannes Rhede, Berlin (DE); Ina Petermann-Stock, Wolfsburg (DE); Carsten Semmler, Cremlingen (DE); Andro Kleen, Duisburg (DE); Markus Neumann, Vordorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 344 days.

(21) Appl. No.: 14/267,384

(22) Filed: May 1, 2014

(65) Prior Publication Data
US 2014/0240114 A1    Aug. 28, 2014

Related U.S. Application Data

(63) Continuation of application No. PCT/EP2012/004559, filed on Nov. 1, 2012.

(30) Foreign Application Priority Data

Nov. 1, 2011  (DE) .......................... 10 2011 117 297

(51) Int. Cl.
*B60Q 1/00* (2006.01)
*B60Q 9/00* (2006.01)
(Continued)

(52) U.S. Cl.
CPC .............. *B60Q 9/008* (2013.01); *B60W 30/09* (2013.01); *B60W 30/0956* (2013.01);
(Continued)

(58) Field of Classification Search
CPC ....... B60Q 9/00; B60Q 9/008; B60W 30/09; G08G 1/166
USPC .......................................... 340/435; 701/301
See application file for complete search history.

(56) References Cited

U.S. PATENT DOCUMENTS 7,145,441 B2   12/2006   Knoop et al.
7,515,056 B2    4/2009   Knoop et al.
(Continued)

FOREIGN PATENT DOCUMENTS

CN      101256073 A      9/2008
DE      102 44 205 A1    3/2004
(Continued)

*Primary Examiner* — John A Tweel, Jr.
(74) *Attorney, Agent, or Firm* — Muncy, Geissler, Olds & Lowe, P.C.

(57) ABSTRACT

A method for outputting alert messages of a driver assistance system in a vehicle in which data for moving the vehicle and data regarding accident risks in the surroundings of the vehicle are detected, the detected data is evaluated and attributed to a specific accident risk category and an alert message is output subject to the attributed accident risk category. The method according to the invention is characterized in that from the captured movement of the vehicle a planned movement of the vehicle is derived and it is tested whether without modification of the planned movement of the vehicle a collision of the vehicle with another object will occur, and the manner of outputting the alert message is carried out in dependence on the result of said collision testing. The invention further relates to an associated driver assistance system and to a vehicle having such a driver assistance system.

12 Claims, 7 Drawing Sheets

(51) Int. Cl.
*B60W 30/09* (2012.01)
*G08G 1/16* (2006.01)
*B60W 50/14* (2012.01)
*B60W 30/095* (2012.01)
*B60W 30/08* (2012.01)

(52) U.S. Cl.
CPC ............. *B60W 50/14* (2013.01); *G08G 1/163* (2013.01); *G08G 1/166* (2013.01); *B60W 30/08* (2013.01); *B60W 2050/146* (2013.01); *G08G 1/168* (2013.01)

(56) References Cited

U.S. PATENT DOCUMENTS

| | | | |
|---|---|---|---|
| 7,579,942 B2 | 8/2009 | Kalik | |
| 7,786,896 B2 | 8/2010 | Schmid et al. | |
| 8,412,448 B2 * | 4/2013 | Lee | G08G 1/166 701/301 |
| 8,665,080 B2 * | 3/2014 | Nagamine | G08G 1/166 340/435 |
| 8,849,558 B2 * | 9/2014 | Morotomi | G08G 1/166 701/301 |
| 8,933,796 B2 * | 1/2015 | Kumabe | G08G 1/161 340/435 |
| 2007/0146164 A1 | 6/2007 | Schmid et al. | |
| 2008/0084283 A1 | 4/2008 | Kalik | |
| 2008/0091352 A1 | 4/2008 | O'Hare | |
| 2008/0205706 A1 | 8/2008 | Hongo | |
| 2010/0030474 A1 | 2/2010 | Sawada | |

FOREIGN PATENT DOCUMENTS

| | | |
|---|---|---|
| DE | 10 2004 041 229 A1 | 3/2006 |
| DE | 10 2004 056 027 A1 | 5/2006 |
| DE | 10 2005 014 803 A1 | 10/2006 |
| DE | 10 2005 047 591 A1 | 4/2007 |
| DE | 10 2007 029 033 A1 | 12/2008 |
| DE | 10 2009 034 386 A1 | 2/2010 |
| DE | 10 2009 058 035 A1 | 8/2010 |

* cited by examiner

METHOD FOR OUTPUTTING ALERT MESSAGES OF A DRIVER ASSISTANCE SYSTEM AND ASSOCIATED DRIVER ASSISTANCE SYSTEM

This nonprovisional application is a continuation of International Application No. PCT/EP2012/004559, which was filed on Nov. 1, 2012, and which claims priority to German Patent Application No. 10 2011 117 297.5, which was filed in Germany on Nov. 1, 2011, and which are both herein incorporated by reference.

BACKGROUND OF THE INVENTION

Field of the Invention

The present invention relates to a method for outputting alert messages of a driver assistance system in a vehicle. In the method, data on the movement of the vehicle and data on accident risks in the vehicle's surroundings are acquired, the acquired data are evaluated and assigned a specific accident risk category, and an alert message is output depending on the assigned accident risk category. The invention further relates to an associated driver assistance system and to a vehicle with such a driver assistance system.

Description of the Background Art

Driver assistance systems or modules for such system, which support the driver of the vehicle during the task of driving, are being employed increasingly in vehicles. The driver assistance systems for this purpose comprise sensors in order to detect events in the vehicle's environment, its interior, or events generated by in-vehicle devices. The data produced by the sensors are evaluated and converted into signals, which support the driver during driving of the vehicle. The generated signals can result in the outputting of information or warnings. Further, the signals can also intervene directly in the driving process, for example, by activating the vehicle's brakes in a defined manner.

Meanwhile, there are many driver assistance programs for accident risk detection, which are used in vehicles. These include, for example, a lane adherence assist or lane adherence support, adaptive cruise control (ACC), a collision radar, a device for automatic emergency braking, an antilock braking system, traction control, an electronic stability program, and a parking assist system.

If many driver assistance programs are used in a vehicle, the need arises for the most intuitively comprehensible presentation of the system outputs. With the growing number of driver assistance modules, the handling and reading or acquisition of program outputs are becoming increasingly more difficult.

DE 10 2007 029 033 A1 describes a method for outputting warnings for a motor vehicle with a plurality of driver assistance systems. To enable a simple information assimilation for the driver, the warnings are divided into at least two different time criticality categories and displayed as a function of these. The outputting of the warnings occurs via the display of protection circles, which show different protection zones formed around a graphic representation of the vehicle. The individual protection circles correspond to the time criticality categories. Time-critical warnings are visualized by a protection circle lying farther to the inside and preferably depending on the time criticality signaled not only visually, but in addition haptically and/or acoustically.

DE 102 44 205 A1, which corresponds to U.S. Pat. No. 7,515,056 and to U.S. Pat. No. 7,145,441, describes a method and apparatus for preventing collision of vehicles, in which motion parameters of the vehicle are detected by means of sensors. A failure-to-yield criterion and a collision risk criterion are derived from these, from which a risk level is ascertained. At a low risk, the driver can be made aware of the risk situation by optical and/or acoustic signals. In further escalation stages, in addition haptic signals can be output and the brakes and/or the steering can be prepared or in fact influenced for their imminent use.

U.S. Pat. No. 7,579,942 B2 describes an apparatus for supporting the safe operation of a vehicle. In this case, a collision prediction can be generated by means of a plurality of sensor signals and a model. An alarm is output if a collision risk above a specific risk threshold is determined.

SUMMARY OF THE INVENTION

It is the object of the present invention to provide a method for outputting alert messages of a driver assistance system and an associated driver assistance system, which enable simple information assimilation by the driver of the vehicle.

In an embodiment, the method of the invention is characterized in that a planned movement of the vehicle is derived from the detected movement of the vehicle, and it is checked whether a collision of the vehicle with another object will occur without a change in the planned movement of the vehicle. The manner of outputting the alert message is then carried out depending on the result of said collision check. The differentiated outputting of the alert message has the advantage that the driver can be informed in a simple manner whether the alert to be output refers only to a general risk, which may not occur at all, or whether the alert refers to an acutely imminent collision that will occur without intervention by the driver. The driver can be addressed even more selectively with the method of the invention, if his intervention, particularly a specific intervention such as, e.g., a full stop or evasive action, is definitely necessary.

The data on the vehicle's movement can comprise the vehicle's speed and direction. The movement can be assumed to be, for example, linearly constant depending on the situation. Further, longitudinal and lateral accelerations of the vehicle can also be considered. For example, immediately preceding changes in the speed magnitude and/or steering angle, e.g., a constant steering radius, are taken into account.

The data on accident risks can comprise position data and/or movement data of objects in the surroundings of the particular vehicle, which are compared with the data on the movement of the particular vehicle. From this conclusions can be drawn whether the vehicle is threatened with a collision with another object.

According to an embodiment of the invention, two different types of accident risks can be differentiated, namely, imminent collisions and risk zones. Whereas in the case of imminent collisions, a collision is assumed on the part of the system if the planned movement of the vehicle is not changed; in the case of detected risk zones it is not assumed with certainty that a collision will occur.

For this purpose, not only is the detected accident risk itself analyzed on the system side but in addition the planned vehicle operation is also considered. This comprises in particular the detection of a normal situation, which takes into account the driver's reactions during the routine execution of the upcoming driving task. Thus, it can be derived from the determined course of the street and/or an entered navigation route whether, for example, a vehicle is entering a curve. It should be evaluated in particular in the collision check whether the driver is performing this driving task according to the normal situation. In this case in particular a linear movement of the vehicle is not to be assumed. The process can be carried out on the system side in a similar way, for example, during parking or during already started braking before a traffic light in that the planned driver reaction is considered according to a normal situation for the planned vehicle movement.

Further, the data on accident risks also comprise conditions that usually promote an accident and thus represent a general risk. For example, a fog bank is regarded as a latent risk for a collision, whereby, because of the reduced visibility, a collision cannot be predicted with certainty. Other risks are, e.g., wet or slippery conditions due to which the risk of the vehicle skidding or overturning can exist even without a collision obstacle.

In an embodiment of the method of the invention, it is provided that the manner of outputting the alert message is differentiated visually depending on the result of the collision check. A visual differentiation has the advantage that the alert message can be configured even in an early warning stage as a visual information output and the driver learns the differentiation feature(s) in a relatively noncritical situation. On the one hand, in this warning stage he usually has a rather high comprehension in order to perceive and memorize the differentiation depending on the collision check. On the other, it is also prevented that even in an early warning stage the driver is encumbered with rather obtrusive output modalities, e.g., acoustic signals.

In an embodiment of the method of the invention, it is provided that the alert message comprises a display of rings, particularly circular rings, and/or ring segments, particularly circular ring segments, which symbolize the vehicle surroundings. The manner of outputting the ring image is carried out here depending on the result of the collision check, whereby the number of rings and/or ring segments is independent of the result of the collision check. A ring image has established itself as an especially intuitively graspable "protective shield" metaphor, as has already been described in the above-cited DE 10 2007 029 033 A1. The retention of the circular ring structure independent of the result of the collision check supports the standardization of a plurality of warning systems and a high recognition level for other warning parameters, particularly different escalation stages. It is advantageous further, if in addition the entire screen splitting, contours, and scale of the circular ring image do not depend on the result of the collision check in order to increase the recognition level.

In an embodiment of the method of the invention, it is provided that the visual display of the alert message differs in color, brightness, degree of transparency, and/or its time pattern. Time patterns comprise, e.g., flashing, dimming, or a change in color. These features can be rapidly grasped, without the driver having to concentrate his attention explicitly on the visual part of the alert message. Especially intuitive is a color selection of a yellow shade if the collision check is negative, and a red shade if the collision check is positive.

In an embodiment of the method of the invention, it is provided that the length of time to reach a position of accident risk and/or to a point in time at which a change in vehicle movement is necessary to avoid a collision is determined and the accident risk is assigned a time criticality level depending on the determined length of time. The manner of outputting the alert message is then carried out depending on the assigned time criticality level. In particular, a ring image or circular ring image is selected for the visual part of the alert message and each time criticality level is assigned a corresponding ring or circular ring. The alert message is advantageously differentiated furthermore depending on the assigned time criticality level by haptic and/or acoustic features. The alert messages can be flexibly configured in this way for the individual time criticality levels.

In the assignment of the time criticality levels, in one embodiment of the method of the invention, in addition a normal reaction time is considered which is dependent on the particular driving situation and driving task. Said normal reaction time can be selected as relatively long, for example, for confusing or complex driving situations, e.g., in city traffic. It can be set as relatively short for simple driving situations or in driving tasks in which the driver expects specific collision objects, such as, for example, during parking. The configuration of the time criticality levels can be adjusted so that independent of the particular driving task averaged over many standard traffic situations a similar probability distribution shows that a specific time criticality level has been reached. In this way, the driver can assign the alert messages better to the actually existing risk.

In an embodiment of the method of the invention, it is provided that no acoustic and/or haptic differentiation of the outputting of the alert message occurs for a first time criticality level independent of the result of the collision check and that there is an acoustic and/or haptic differentiation of the output of the alert message for a second time criticality level depending on the result of the collision check. In particular, for the lowest time criticality level no haptic and/or acoustic signals are output, so that the alertness of the driver is not reduced in this regard over time. At higher time criticality levels, the alert messages for situations in which a collision is imminent without intervention by the driver, are differentiated from general risk situations without a definite collision by the provision of additional haptic and/or acoustic signals. In this regard, according to one embodiment, acoustic and/or haptic signals, which are output in general risk situations, will be more intense in the case of an imminent collision.

If the length of time until the position of the accident risk is reached falls below a critical threshold, optionally automatic vehicle control occurs, if it was determined by means of the collision check that without a change in the planned movement of the vehicle a collision of the vehicle with another object will occur and that the time interval for a driver's reaction is too short. The beginning of the automatic vehicle control is reported to the driver, so that he understands the prevention of the corresponding driving task. After the automatic vehicle control ends, the driver is again given back the driving task, i.e., complete control over the vehicle, about which he is also informed. The informing during the prevention and/or return of the driving task occurs advantageously visually, optionally with acoustic support, e.g., in the form of a plain text message.

In an embodiment of the method of the invention, a driving situation category is determined from the direction, speed, the steering, and/or transmission setting of the vehicle. The perspective of the vehicle surroundings symbolized by the ring image is changed in the visual outputting of the alert message with a change between two driving situation categories. The image is adjusted to the particular situation, without reducing the recognition level. Driving situation categories differ particularly between forward and reverse driving.

In an embodiment of the method of the invention, a parking or maneuvering process is detected and the ring image is changed to a plan view with a change in the parking or maneuvering process. This adjustment for a parking or maneuvering process is expedient to sensitize the driver to risks in all possible angle ranges in the vehicle surroundings.

Particularly for parking and maneuvering processes with great steering wheel angles, concealment of the display area used thus far can occur. Further, a driving situation can require the driver to change his view direction. He needs to look backwards or to the side, for example. Therefore, it is provided in another embodiment that with a change between two driving situation categories the ring image of the vehicle surroundings is shown alternatively or in addition at a changed display position, e.g., on a further display disposed in the vehicle.

The driver assistance system of the invention comprises a plurality of sensors for acquiring data on the movement of the vehicle and data on accident risks in the vehicle's surroundings. The driver assistance system of the invention comprises further an evaluation unit with the aid of which the acquired data can be evaluated and assigned to a specific accident risk category, and an output device for outputting alert messages, particularly one or more displays, a loudspeaker, and haptic output output device. It comprises further a control unit which is connected to the evaluation unit and to the output device and which controls the output device in such a way that the alert messages can be output depending on the assigned accident risk category. The driver assistance system of the invention is characterized in that a planned movement of the vehicle can be derived by means of the evaluation unit from the detected movement of the vehicle and it is checked whether a collision of the vehicle with another object will occur without a change in the planned movement of the vehicle, and the output device can be controlled by the control unit in such a way that the manner of outputting the alert message is carried out depending on the result of said collision check. The driver assistance system of the invention is particularly suitable for carrying out the method of the invention. Therefore, it also has the advantages of the method of the invention.

According to the invention, a vehicle is equipped with such a driver assistance system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
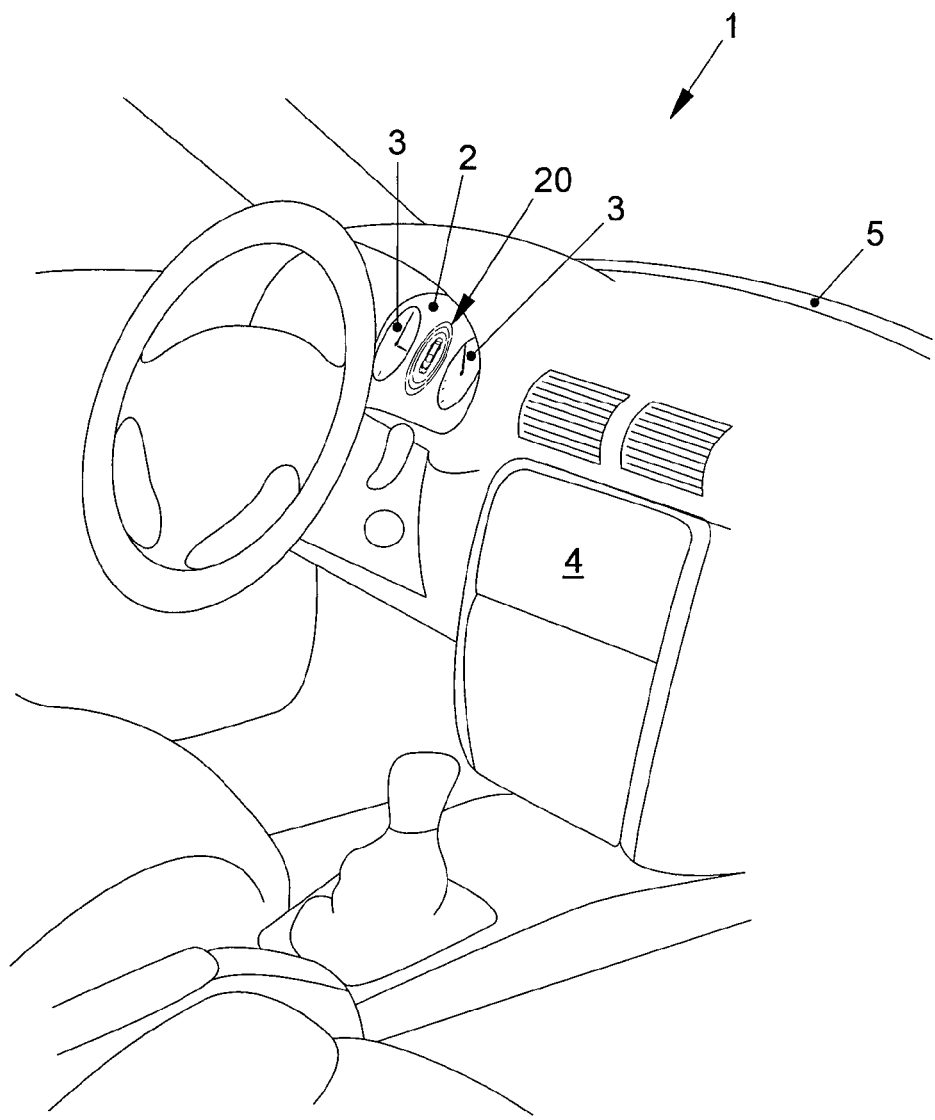
FIG. 1 shows a view of the cockpit of a vehicle with a driver assistance system according to an exemplary embodiment of the invention.

A view of the cockpit of a vehicle 1 with a driver assistance system according to an exemplary embodiment of the invention is shown in FIG. 1. The driver assistance system uses combination display 2 of vehicle 1 to display alert messages visually, e.g., in form of circular ring images 20, as will be explained in still greater detail in conjunction with the method of the invention. The alert messages in this case can be shown on a freely programmable display area between round instruments 3. Further, a multifunction display 4 is arranged in the upper area of the center console on which the alert messages can also be displayed.

To differentiate the alert messages for the driver of vehicle 1 according to the risk situation and an associated accident risk category so that he is well informed or alerted as appropriate for the situation, without this being perceived as annoying, a number of other multimodal output device are provided in the cockpit of vehicle 1. A light rail 5 runs along the dashboard, e.g., at the point of contact with the front windshield; this is, for example, a light guide or a string of LED lights (LED=Light Emitting Diode), which can light up or flash in different colors and patterns according to the accident risk category. A loudspeaker or signal tone generator and different haptic device, e.g., a vibration motor in the steering wheel and on the foot pedals (not shown), are provided as further output device.

Figure 2:
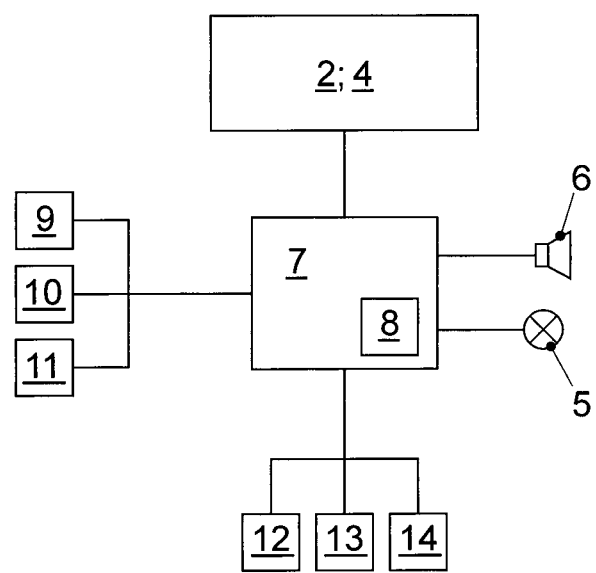
FIG. 2 shows schematically the basic structure of the driver assistance system shown in FIG. 1.

The schematic basic structure of the driver assistance system is shown in FIG. 2. The driver assistance system has a plurality of driver assistance devices. A control unit 7 receives data on accident risks in the vehicle's surroundings via distance sensors 9 and via a camera system 10. Distance sensors 9 are placed, for example, in a manner known per se in the front and rear bumpers of vehicle 1. Camera system 10 comprises, for example, an attachable camera module, which is placed in the area between the roof liner and front windshield. Data on the movement of vehicle 1 are received, on the one hand, via the engine control (not shown) and, on the other, are acquired from a GPS receiver 11 (GPS=Global Positioning System) and sent to control unit 7. General data on the surroundings of vehicle 1, e.g., in regard to bridges, tunnels, roadwork, or traffic jams, can also be received via GPS receiver 11. These data can be sent alternatively or in addition from a navigation system with a digital geographic map.

An evaluation unit 8 is integrated into control unit 7 in which the data acquired via distance sensors 9, camera system 10, and GPS receiver 11 are combined and evaluated. In this regard, individual accident risks are identified and assigned corresponding accident risk categories. In particular, the planned and probable movement of vehicle 1 is derived proceeding from the detected movement of vehicle 1 from the upcoming road section detected by sensors and by means of the stored navigation route. For this purpose, the spatial and time differences in the movement of vehicle 1 from a normal movement according to the navigation route are determined. A driver can be warned early on about blind curves, when he deviates from the ideal route. Further, it is checked whether a collision of vehicle 1 with another object will occur without a change in the planned movement of vehicle 1.

Control unit 7 then generates the associated alert messages and controls different output device connected to control unit 7 to output the alert message, as will be explained in still greater detail hereafter in conjunction with the method of the invention.

The output device comprise combination display 2, multifunction display 4, and light rail 5 for the visual outputting of alert messages, which have already been described in regard to FIG. 1. Furthermore, a loudspeaker 6 or signal tone generator for the acoustic outputting of alert messages can be controlled via control unit 7.

Further, different haptic outputs of the alert messages can be generated via control unit 7. For this purpose, control unit 7 is connected to steering wheel 12, gas pedal 13, and brake system 14, particularly the brake pedal and brake hydraulic system. Haptic signals can be controlled by means of control unit 7 at steering wheel 12, e.g., as a slight shaking or vibration, in order to reach the driver with the alert message via this modality. The acceleration resistance of gas pedal 13 can be controlled by means of the control unit so that it is changeable. In addition, the brake pressure in the brake hydraulics can be increased by means of control unit 7 or brake system 14 can be controlled to bring about a full emergency stop.

Figure 3:
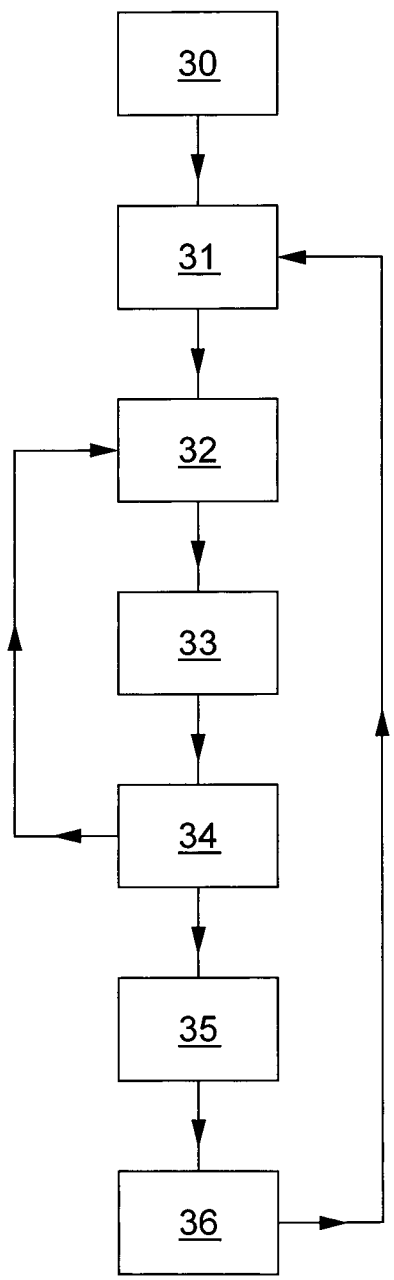
FIG. 3 shows a flowchart of the method for operating a driver assistance system according to an exemplary embodiment of the method of the invention for outputting alert messages of a driver assistance system.

The generic process of the method of the invention according to an exemplary embodiment will now be described with the use of a flowchart with respect to FIG. 3. The driver assistance system, for example, described with respect to FIGS. 1 and 2, can be used to carry out the method. The method is, for example, part of a permanently installed program of the driver assistance system. It is especially suitable to be used as an overall routine of an alert module for a number of different traffic alert programs and support programs for vehicle control.

The driver assistance program is initialized in process step 30. This occurs, for example, when the ignition key is inserted or the engine is started, so that the driver even at the start of driving profits from the overall concept of the alert module.

A driving situation category is determined first in process step 31. For this purpose, evaluation unit 8 accesses different currently valid data for vehicle control. It evaluates in particular the speed, steering angle, and transmission setting of vehicle 1. A parking or maneuvering process, e.g., with engaged reverse gear and/or at low speed with an extreme and changing steering wheel angle, city driving, and highway driving, e.g., when a specific speed is exceeded, can be identified in this way. The driving situation category is stored as a parameter for the further program sequence.

The accident risk determination is carried out in process step 32. For this purpose, the received data on the surroundings of vehicle 1 are compared in evaluation unit 8 with the data on the movement of vehicle 1. In this regard, the data from the different distance sensors 9 and from camera system 10 can also be checked for consistency among each other. In particular, stationary or moving objects in the vehicle surroundings are identified in this way or the condition of the surroundings as a potential accident risk is determined. For example, fog, poor visibility, or a slippery road surface is determined in the direction in which vehicle 1 is traveling. It is determined in particular whether the view in an angle range is so poor that the road condition and/or objects in this direction can no longer be detected with sufficient certainty; i.e., it also cannot be determined whether or not a collision is impending.

In process steps 33 and 34, each identified potential accident risk is assigned an accident risk category by evaluation unit 8. In this regard, in process step 33 it is checked for each potential accident risk whether a collision of vehicle 1 with another object would occur without a change in the planned movement of vehicle 1, i.e., without braking or steering being performed by the driver or automatically. The category classification of accident risks distinguishes especially two types of accident risks: those in which a collision is definite or very likely without intervention in the vehicle control, therefore an alert should be given of a specific collision risk, and those where a collision is not definite, only a general risk alert should be given.

In process step 34, the length of time until the position of the accident risk is reached is determined for each potential accident risk. In the case that the position cannot be reached with certainty (i.e., that a collision or entry into the risk zone is not necessarily given), the length of time can be considered that passes until the shortest distance to the position of the accident risk is reached. Depending on the length of time thus determined, the accident risk is assigned one of three time criticality levels. In particular, it is also considered according to the accident risk whether vehicle 1 including the driver's reaction time can still be brought to a stop before the position of the accident risk.

The assignment of the time criticality levels can occur further as a function of the determined driving situation category. Thus, the driver will expect very specific accident risks, for example, during parking and possibly will react more quickly than in comparable situations in moving traffic. The determination of the length of time, however, occurs independent of the result with which the collision test was ended in process step 33.

In the case of highway driving, it proved to be a useful classification that the lowest time criticality level is achieved when the length of time is still greater than 3-10 seconds, e.g., 5 seconds. During this time period, the driver can still take up information without a great time pressure and handle it sensibly and responsibly. The upper limit can be established according to the situation or left open. In the latter case, the lowest time criticality level is reached when the potential accident risk was identified for the first time. The former case, particularly for highway driving with a low traffic volume, is a possible option for not utilizing the lowest time criticality level ineffectively. No advance warning would then be given in the case of a vehicle that is ahead on the horizon.

If this length of time is shorter, but is still above a second threshold, between 1.5 seconds and 3 seconds, e.g., at 2 seconds, the second time criticality level is reached. During this time period, the driver still has the option of acting responsibly, particularly if he previously had the opportunity to be informed or forewarned in the lowest alert level.

If this length of time is shorter still, but is still above a third threshold value between 0.5 seconds and 1.5 seconds, e.g., at 1 second, the third and thereby highest time criticality level is reached. During this time period, the driver usually has only the possibility of acting reflexively.

If the driver still does not intervene, from the system side the driver can be temporarily released, completely or partially, from his driving task. E.g., an automatic full stop is executed.

In process step 35, finally a consolidation of results is performed in which the alert message to be output is based on the most critical accident risk. If a number of potential accident risks are determined, it should be prevented that the driver of vehicle 1 is overwhelmed with an abundance of signals. The selection of the most critical accident risk depending on the embodiment can be based on the time criticality or on the result of the collision check. Depending on the driving situation category, it can be expedient to give the driver a priority alert of a time-critical risk, e.g., imminent driving into a fog bank, or of a collision object still far ahead, e.g., tail end of a traffic jam.

In process step 36, finally an alert message is provided depending on the assigned accident risk category. The manner of providing the alert message depends on the result of the collision check, particularly depending on whether the collision check is positive or negative during the consolidation of the results in process step 35 in the case of the most critical accident risk. To this end, control unit 7 controls one or more output device, i.e., the display areas of combination display 2 and multifunction display 4, light rail 5, loudspeaker 6, or the haptic device in steering wheel 12, gas pedal 13, and braking system 14.

The method is continued iteratively, whereby data on the surroundings of vehicle 1 and data on the movement of vehicle 1 are determined continuously according to process step 32. The determination of driving situation category 31 may optionally not be included in the iterative process, but only considered when certain criteria trigger a corresponding event. For example, going into reverse is such an event, as a result of which a triggering signal is sent to control unit 7 in order to change to the driving situation category "parking/maneuvering."

The visual outputs of alert messages depending on the result of the collision check, the assigned time criticality level, and the driving situation category are shown in FIGS. 4 to 9. The provision of the alert messages is further also differentiated acoustically and haptically, particularly depending on the result of the collision check and the assigned time criticality level.

In order to provide the driver with a standardized presentation of a plurality of driver assistance programs, a basic type of the visual alert message is provided independent of the particular driving situation category. The basic type is based on an intuitively perceptible circular ring image 20 as a so-called "protective shield" metaphor, which symbolizes the vehicle surroundings. Each time criticality level is assigned a circular ring which is divided into segments. The segment division can occur according to angle ranges detectable by single distance sensors 9 or camera system 10. In the shown case, there are four 90° sectors for a warning direction forward, to the back, to the right, and to the left.

Depending on the achieved time criticality level, the corresponding circular ring segments 21A-21G are visually emphasized. The number of shown circular rings is independent of the collision check result. Three circular rings are used for all images in order to leave no doubt for the driver as to the escalation phase of the system.

Situations during highway driving are shown in FIGS. 4-8. Circular ring image 20 is selected as a perspective view from the bird's eye perspective in the direction of travel and circular ring image 20 is shown on combination display 2. For this driving situation category, the back circular ring segments in the vicinity of the vehicle rear are not shown. The perspective can be changed optionally as a function of the vehicle speed. The perspective can be selected, flatter for highway driving than for city driving, for example.

Figure 4:
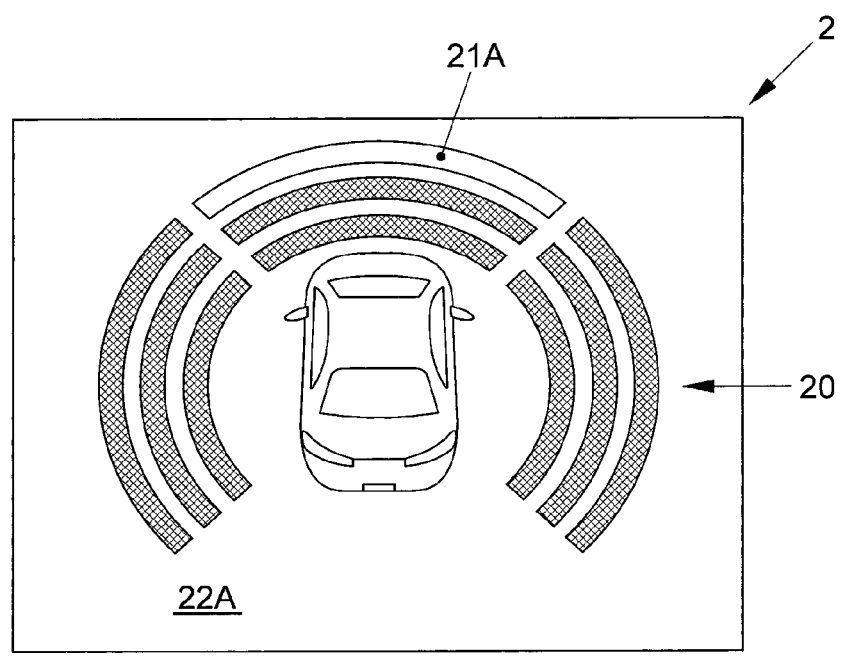
FIGS. 4-9 show visual displays of alert messages depending on the result of a collision check, the assigned time criticality level, and the driving situation category according to an exemplary embodiment of the method of the invention for outputting alert messages of a driver assistance system.

In FIG. 4 the evaluation provides the data in vehicle 1 that there is an accident risk ahead. As soon as the condition for the first time criticality level is reached, circular ring segment 21A is visually emphasized. The background is shown in a color 22A, for example, in a pale gray shade. Furthermore, information on the upcoming accident risk can be displayed. In this stage, it is assumed that the driver can still visualize the situation without time pressure. At this stage, this can still be any possible accident risk. An acoustic and haptic outputting of the alert message does not occur.

Figure 5:
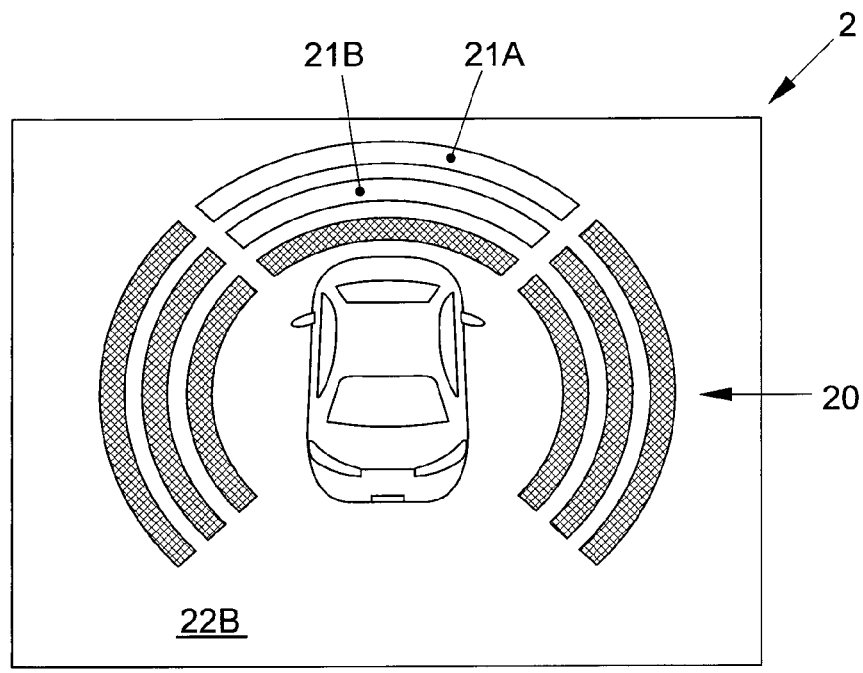

Proceeding from FIG. 4, vehicle 1 in FIG. 5 has come closer to the risk zone and the condition for the second time criticality level is reached. The collision check is negative, i.e., even without a change in the movement of vehicle 1 a collision is not certain. Evasive action or braking is not necessary. The accident risk is, e.g., a hazardous stretch of road, e.g., a frozen-over section of a bridge, a section of roadwork, or a fog bank. Circular ring segment 21B is now visually emphasized in addition to circular ring segment 21A. Because there is no specific risk of a collision, but only a general risk, the color 22B, e.g., yellow, is now selected, for the background. The driver intuitively connects a general risk alert with this. In addition to the display on combination display 2, light rail 5 is illuminated in yellow (not shown). An acoustic and haptic outputting of the alert message does not occur.

Figure 6:
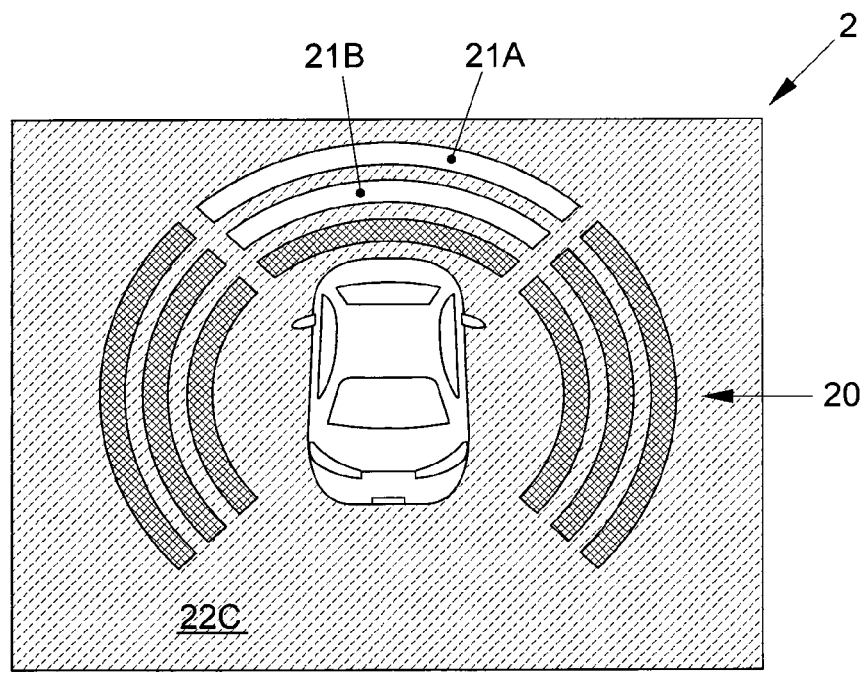

Alternatively to FIG. 5, the collision check according to the situation shown in FIG. 6 is positive this time, i.e., a collision will definitely occur without a change in the movement of vehicle 1. The accident risk is, e.g., a broken-down vehicle or a tail end of a traffic jam. In order to make the driver aware of the need for evasive action or to prepare him for braking, not only is the circular ring segment 21B visually emphasized, but a signal color 22C, e.g., red, is additionally selected for the background. The driver intuitively connects a real risk with this. In addition to the display on combination display 2, light rail 5 is illuminated in red (not shown) and a single chime signal is output via loudspeaker 6. The chime signal is to warn the driver, on the one hand, but on the other, it is to be so unobtrusive that a reflexive reaction by the driver, which is not yet needed at this point in time, is avoided.

Figure 7:
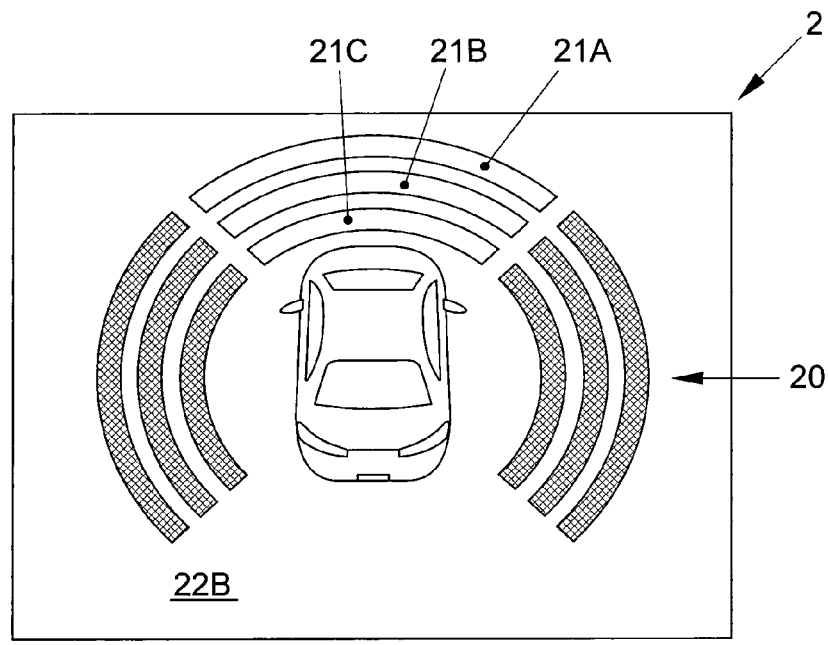

In FIG. 7, a situation is shown in which the condition for the third time criticality level was reached and the collision check is negative. This situation can have arisen from the situation shown in FIG. 5, in that the vehicle has come closer to the hazardous section of road. Alternatively, this situation can also have arisen from the situation shown in FIG. 6, in that the driver, e.g., has successfully taken an early evasive action, so that now he is no longer on a collision course with the broken-down vehicle. Circular ring segment 21C is now emphasized visually in addition to circular ring segment 21A and 21B. Because this is again only a general risk, the color 22B is again selected for the background. The illumination on light rail 5 is increased in brightness and begins to flash, in order to make the driver realize the physically close risk (not shown). An acoustic outputting of the alert message does not occur. It can be provided optionally, however, to warn the driver haptically to the effect that gas pedal 13 is acted upon by an increased counterpressure. The driver is reminded thereby that a speed reduction in the increased risk zone can generally reduce the accident risk and also the severity of the accident.

Figure 8:
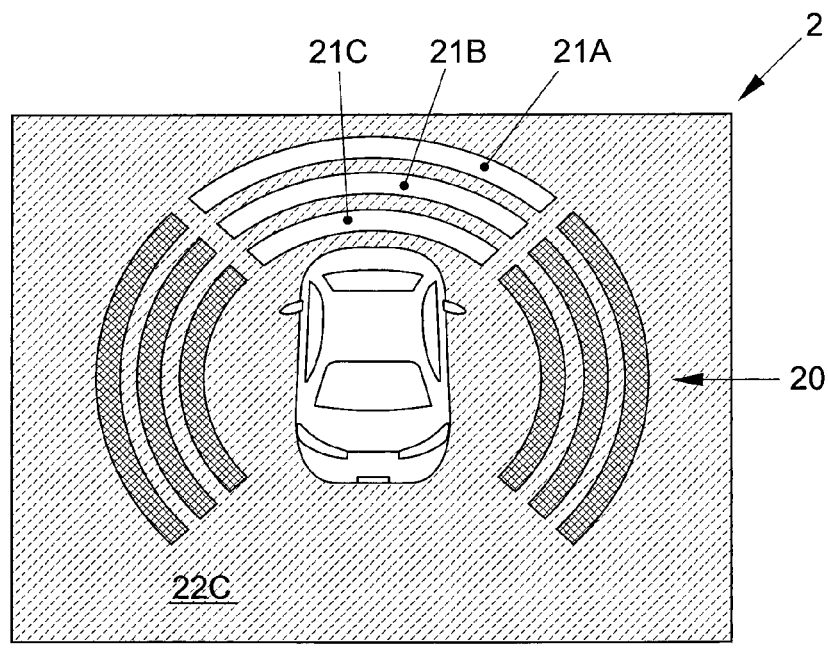

Alternatively to FIG. 7, according to the situation shown in FIG. 8, the collision check is again positive, i.e., that a collision will definitely occur without a change in the movement of vehicle 1. In order to now make the driver aware of the last possibility to begin taking evasive action or braking himself, not only is circular ring segment 21C visually emphasized and the signal color 22C selected for the background, but furthermore the illumination of light rail 5 is intensified (not shown) and a 2 kHz warning sound is output via loudspeaker 6. In addition, the alert message is output haptically in that steering wheel 12 is caused to vibrate slightly and the brake pressure in braking system 14 is increased.

Instead of the visual differentiation or in addition to the visual differentiation by the different background colors, in particular the color, brightness, and/or the degree of transparency of the circular ring segments can also be different, depending on the result of the collision check.

Figure 9:
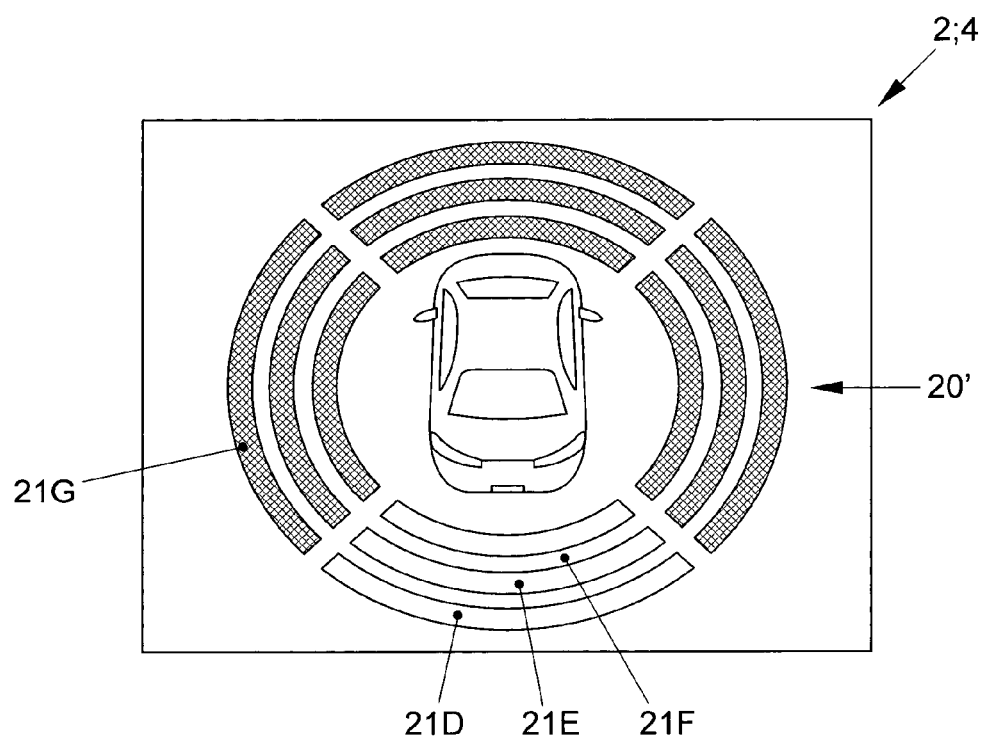

A situation during a parking or maneuvering process is shown in FIG. 9. At the end of a trip, it is detected, for example, that the vehicle has been stopped. Thereupon, the driving situation category is determined again and circular ring image 20 is changed from the perspective view to a plan view. In this way, the driver is informed that now accident risks from all directions are to be increasingly expected. In the shown case, reversing was engaged and an accident risk in the back sector of the vehicle is determined. Depending on which time criticality level is assigned, circular ring segments 21D-21F are visually emphasized. Depending on the result of the collision check, the outputting of the alert message is differentiated. In the case of a positive collision check, in addition to the visual outputting of the alert message, an acoustic signal is output via loudspeaker 6.

During a parking or maneuvering process, circular ring image 20 is shown not only on combination display 2, but also automatically on multifunction display 4 and optionally on other displays. This assures that in case the view of combination display 2 is blocked by inconvenient steering wheel angles, the driver can read circular ring image 20 in another position.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for outputting alert messages of a driver assistance system in a vehicle, the method comprising:
   acquiring data on a movement of the vehicle and data on accident risks in surroundings of the vehicle;
   evaluating the acquired data;
   assigning the evaluated data to a specific accident risk category;
   outputting an alert message for each accident risk in each assigned accident risk category;
   deriving a planned movement of the vehicle from the detected movement of the vehicle; and
   checking whether a collision of the vehicle with another object will occur without a change in the planned movement of the vehicle,
   wherein the manner of outputting the alert message is modified based on the result of the collision check.

2. The method according to claim 1, wherein the manner of outputting the alert message is differentiated visually based on the result of the collision check.

3. The method according to claim 2, wherein the alert message comprises a display of rings and/or ring segments that symbolize the vehicle surroundings, wherein the manner of outputting the ring image is carried out based on the result of the collision check, and wherein the number of rings and/or ring segments is independent of the result of the collision check.

4. The method according to claim 2, wherein the visual display of the alert message differs in color, brightness, degree of transparency, and/or its time pattern.

5. The method according to claim 1, wherein the length of time to reach a position of accident risk and/or to a point in time at which a change in the vehicle movement is necessary to avoid a collision is determined, wherein the accident risk is assigned a time criticality level depending on the determined length of time, and wherein the manner of outputting the alert message is carried out depending on the assigned time criticality level.

6. The method according to claim 5, wherein no acoustic and/or haptic differentiation of the outputting of the alert message occurs for a first time criticality level independent of the result of the collision check, and wherein there is an acoustic and/or haptic differentiation of the outputting of the alert message for a second time criticality level based on the result of the collision check.

7. The method according to claim 3, wherein a driving situation category is determined from the direction, speed, steering, and/or transmission setting of the vehicle and wherein the perspective of the vehicle surroundings symbolized by the ring image is changed with a change between two driving situation categories in the visual outputting of the alert message.

8. The method according to claim 7, wherein a parking or maneuvering process is detected and wherein the ring image is changed to a plan view with the change in the parking or maneuvering process.

9. The method according to claim 7, wherein, with a change between two driving situation categories, the ring image of the vehicle surroundings is shown alternatively or in addition at a changed display position.

10. A driver assistance system comprising:
    a plurality of sensors for acquiring data on the movement of the vehicle and data on accident risks in the vehicle's surroundings;
    an evaluation unit with the aid of which the acquired data can be evaluated and assigned to a specific accident risk category;
    output device for outputting alert messages; and
    a control unit connected to the evaluation unit and to the output device and that controls the output device in such a way that the alert messages are output for each accident risk in each assigned accident risk category,
    wherein a planned movement of the vehicle is derived from the detected movement of the vehicle via the evaluation unit and it is checked whether a collision of the vehicle with another object will occur without a change in the planned movement of the vehicle, and
    wherein the output device is controllable by the control unit such that the manner of outputting the alert message is modified depending on the result of the collision check.

11. The method according to claim 3, further comprising a light rail provided along a base of a windshield, wherein the alert message includes lighting of the light rail depending on the result of the collision check.

12. The method according to claim 2, wherein a visual alert provided in response to the collision check is different from visual alerts assigned to each of the specific accident risk categories.

* * * * *